Patented Mar. 4, 1924.

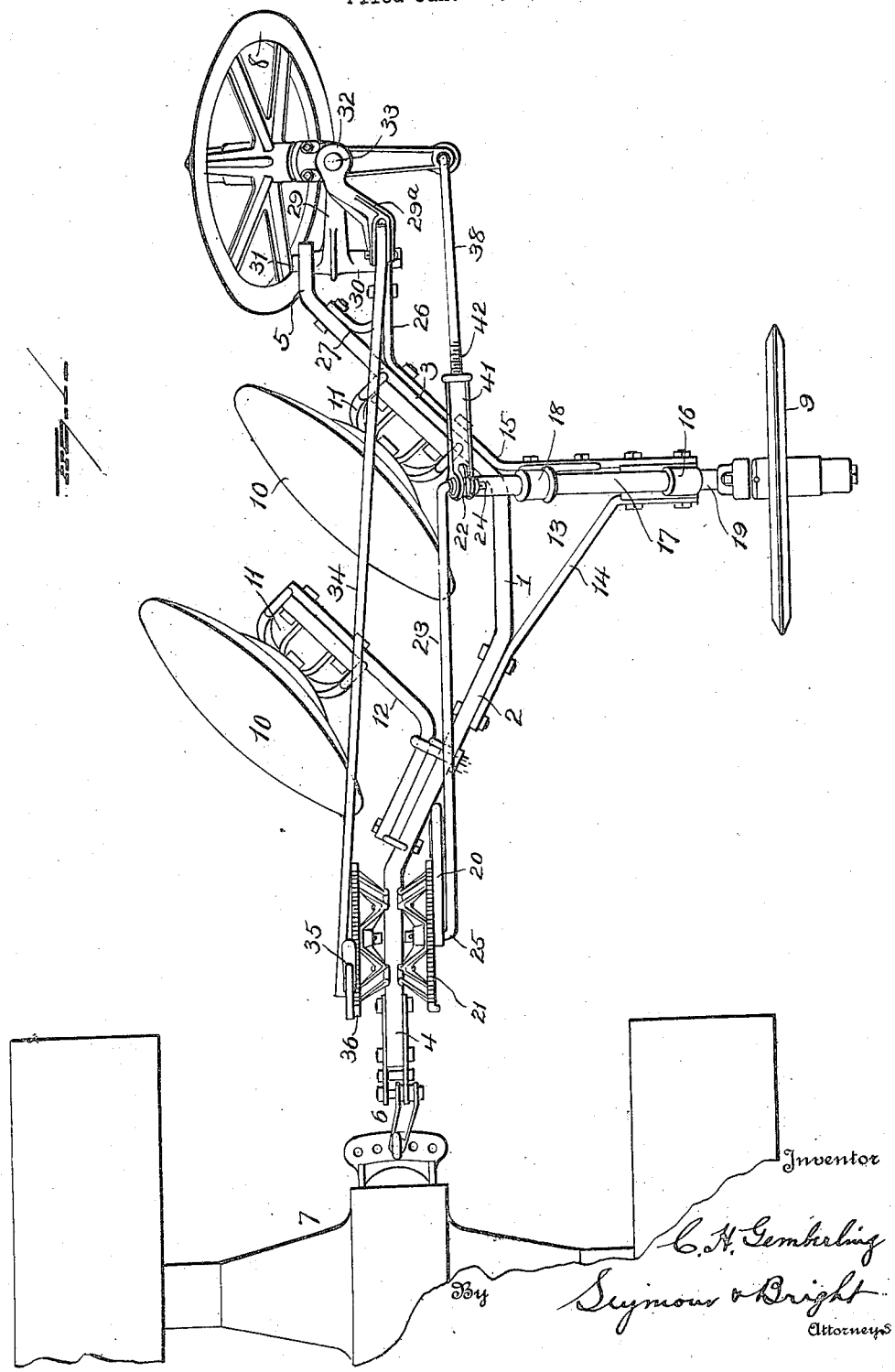

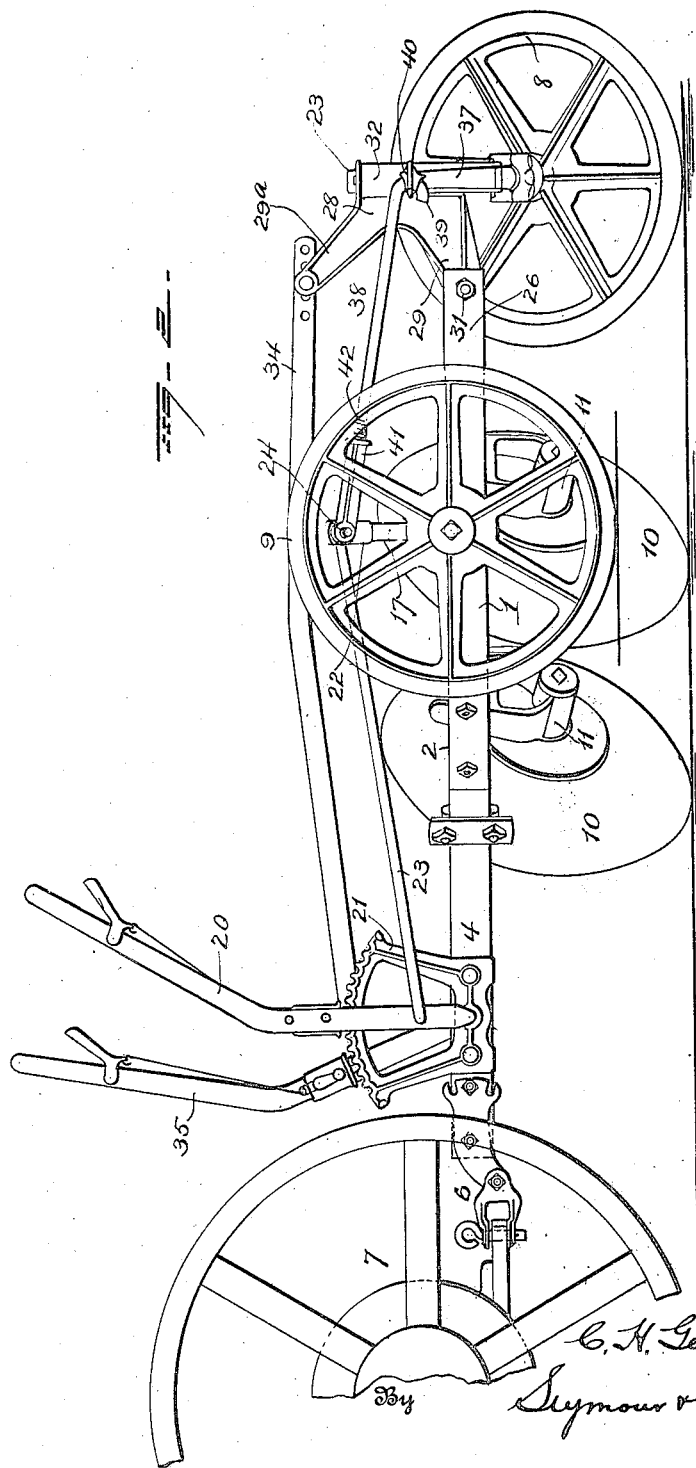

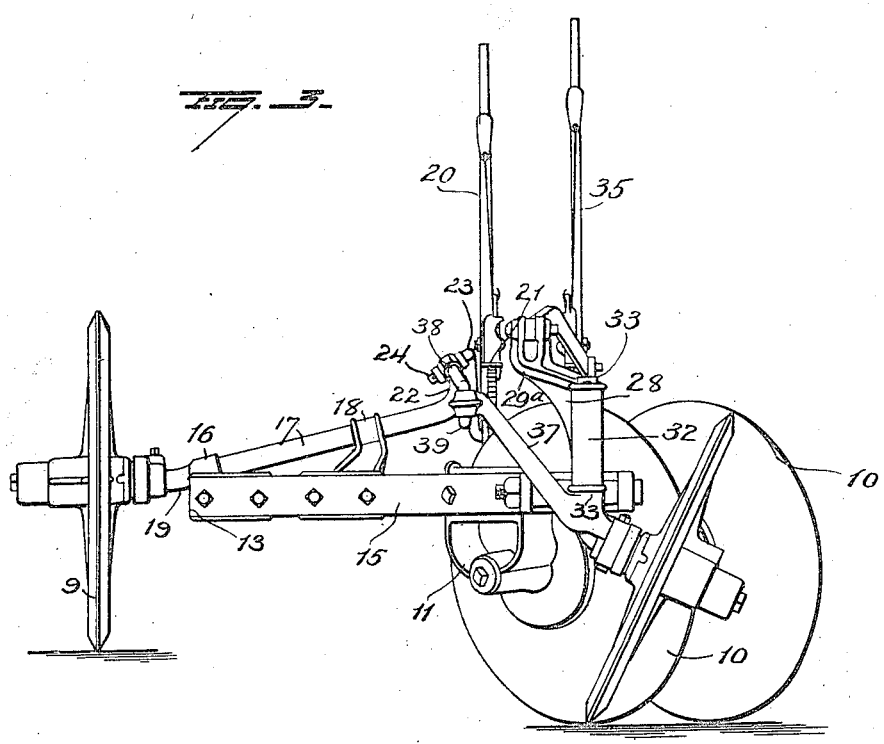

1,485,604

UNITED STATES PATENT OFFICE.

CAMERON H. GEMBERLING, OF SOUTH BEND, INDIANA, ASSIGNOR TO OLIVER CHILLED PLOW WORKS, OF SOUTH BEND, INDIANA.

WHEELED PLOW.

Application filed January 12, 1923. Serial No. 612,272.

*To all whom it may concern:*

Be it known that I, CAMERON H. GEMBERLING, a citizen of the United States, and a resident of South Bend, in the county of St. Joseph and State of Indiana, have invented certain new and useful Improvements in Wheeled Plows; and I do hereby declare the following to be a full, clear, and exact description of the invention, such as will enable others skilled in the art to which it appertains to make and use the same.

This invention relates to improvements in wheeled plows and more particularly to disk plows,—one object of the invention being to provide a disk plow adaptable for use with a tractor as the draft means, and which shall embody a single furrow wheel at the rear end and a single land wheel intermediate of the ends, with simple means for angling said wheels simultaneously and also with means cooperable with the rear furrow wheel axle for raising and lowering the plow frame.

A further object is to so construct a wheeled plow having a single rear furrow wheel and a single intermediate land wheel, that said wheels may be angled simultaneously and caused to be always disposed to travel in parallel paths, and to be disposed in such parallel relation to each other when the plow frame is raised as well as when the plow disks are in working position.

A further object is to provide simple and efficient manually controlled means whereby a rear furrow wheel of a plow may be angled and whereby the frame may be raised and lowered and adjusted for depth plowing by the application of lifting power to the axle of the rear furrow wheel only.

With these and other objects in view, the invention consists in certain novel features of construction and combinations of parts as hereinafter set forth and pointed out in the claims.

In the accompanying drawings;

Figure 1 is a plan view of a disk wheeled plow showing an embodiment of my invention;

Figure 2 is a side elevation, and

Figure 3 is a rear view.

The frame of the plow includes an approximately U-shaped main frame beam 1 having forward and rear diagonal portions 2 and 3,—the forward beam member 2 being extended to provide a beam or frame member 4 approximately coincident with the line of draft of the plow structure, and the rear diagonal member being extended to provide a short rear beam or frame member 5 disposed parallel with the line of draft. Coupling devices indicated at 6 are provided for connecting the forward end of the frame beam with a tractor represented at 7, and by means of which latter the plow structure will be supported in work position, as will be readily understood from an inspection of the drawing and the following description of various features of the structure.

The plow frame is supported on two wheels,—one of which is a furrow wheel 8 located at the rear end of the frame and the other is a land wheel 9 located laterally from an intermediate portion of said frame.

In the embodiment of the invention shown in the drawings, two earth-working disks 10, 10, are shown, each provided with a suitable mounting indicated at 11. The mounting for the forward disk is carried by a laterally and rearwardly projecting arm or beam 12 secured to the forward diagonal member 2 of the main frame beam 1 and the mounting for the rear disk is secured to the rear diagonal member 3 of said main frame beam. While I have shown the plow as being provided with two earth working disks, it will be understood that a single disk or a number greater than two might be employed.

A bracket 13 projects laterally from an intermediate portion of the main frame beam 1 and may comprise two members 14 and 15 secured respectively to the diagonal members 2 and 3 of said main frame beam as clearly shown in Figure 1. The bracket 13 carries at its free end portion, a bearing 16 for an inclined land wheel axle 17, and the member 15 of said bracket supports another bearing 18 for said axle. The outer end portion of the land wheel axle 17 is bent as at 19 so that its spindle portion which enters the hub of the land wheel 9 will form a crank disposed horizontally, thus causing the land wheel to stand in a vertical position as indicated in Figure 3. It will be evident that if the inclined land-wheel axle be turned in its bearings, the land wheel will be so angled (by reason of the horizontal spindle crank on said axle) from the position shown in Figures 1 and 3 and caused to assume a position at an angle to the longitudinal axis of the plow structure. Such angling of the land wheel may be effected by operation of a hand lever 20. This lever is pivotally mounted on a frame of a toothed segment 21 secured to the forward portion 4 of the main frame beam and provided with a suitable detent for cooperation with said segment. The inclined axle is provided at its upper end with an up-turned crank 22 and this crank is connected by a rod 23 with the hand lever 20,—one end of said rod being bent laterally to form a pivot pin 24 for effecting pivotal connection of said rod with the crank and the other end of said rod being bent laterally to form a pin 25 whereby the rod is pivotally connected with the hand lever.

The member 15 of the bracket 13 is extended rearwardly and terminates in an arm 26 disposed parallel with the rear end portion of the main frame beam, a brace 27 being located between said arm and the rear diagonal member of said main frame beam. A lever 28 having the shape of a bell-crank to provide two arms 29 and 29ª, is located at the rear end of the main frame beam and one arm (29) of this lever is made with a transverse tubular or sleeve portion 30 disposed between the arm 26 and the rear beam member 5 and pivotally connected with the same by means of a transverse bolt indicated at 31. That portion of the lever 28 which unites its two arms includes a vertical sleeve 32 which provides a bearing or mounting for the vertical portion of a swivel axle 33 for the rear furrow wheel 8, the spindle portion of said axle which enters the hub of said rear furrow wheel being inclined so that said furrow wheel will be disposed in an inclined position as most clearly shown in Figure 3.

The rear end of a rod or pitman 34 is adjustably connected with the arm 29ª of the bell crank 28 and the forward end of this rod or pitman is connected with a hand lever 35 pivoted to the frame of a toothed segment 36 secured to the forward portion of the main frame beam, and said lever is provided with a suitable detent to engage the segment 36.

It will be seen that by operating the hand lever 35, motion will be transmitted through the rod or pitman 34 to the bell crank 28, thus causing the latter to be turned on its pivotal connection with the rear end of the frame and power to be imparted to the rear furrow wheel and its axle to raise (or lower) the frame (with the land wheel serving as a fulcrum on the ground) to raise or lower the plow disks or adjust them for depth of plowing.

The swivel axle 33 is provided with a fixed arm 37 which projects from said axle adjacent to its spindle portion, in an upwardly and inwardly inclined direction,—the upper end of said arm terminating in a plane which, if extended horizontally, would intersect the rear axle bearing sleeve 35 between the ends of the same. A rod or pitman 38 is pivotally connected at one end with the upper end of the rear axle arm 37, said rod or pitman being provided (in the embodiment of the invention shown in the drawing) with a hook 39 which engages an eye 40 at the upper end of said arm 37. The rod or pitman 38 may be made in two members adjustably connected together, the forward member 41 being made tubular and internally threaded to receive a threaded portion 42 of the other member of said rod or pitman. The forward end of the pitman member 41 may be bifurcated to receive the crank 22 on the inclined land-wheel axle and pivotally connected to said crank by the same pivot member 24 which pivotally connected the rod or pitman with said axle crank.

With the construction and arrangement of parts as above described, when the hand lever 20 is operated, movement will be imparted by the rod or pitman 23 to the inclined land-wheel axle and by the rod or pitman 38—41 to the arm 37, on the rear furrow wheel axle, so that both land and furrow wheels will be moved in a manner to angle them simultaneously and to the same extent or to bring them from angled positions to positions parallel with the longitudinal axis of the plow structure and the line of draft,—said land and furrow wheels being maintained in parallel lines of travel at all times, although the land wheel is disposed perpendicular to the ground and the rear furrow wheel is inclined to counteract land pressure.

With my improved construction, the substantially parallel relation of the inclined furrow wheel and the perpendicular land wheel will be maintained when the lifting lever 35 is operated as when the shifting or angling lever 20 is operated.

When the plow is raised or lowered by operating the lifting lever 35, the rear furrow axle will turn slightly in its bearing on the bell-crank lever 28. This slight turning of the furrow wheel axle is controlled by the furrow-wheel axle-arm 37 which is held in position by the rod or pitman 38—41, the latter being in turn coupled to the shifting lever rod or pitman 23. The location of the coupling at 40 between the rear-wheel axle arm 37 and the rod or pitman 38—41 is important especially in keeping the two wheels parallel while the lifting lever 35 is being operated.

Various changes might be made in the details of construction of my invention without departing from the spirit of the latter or limiting its scope and hence I do not wish to restrict myself to the precise details herein set forth.

Having fully described my invention what I claim as new and desire to secure by Letters-Patent, is:—

1. In a plow, the combination with a frame, a rear furrow wheel and a land wheel, of a swiveled axle for the rear furrow wheel, an inclined land-wheel axle having a crank spindle at one end entering the hub of the land wheel, and manually operable means for turning said land-wheel axle and said pivot axle simultaneously to adjust the angularity of said rear furrow and land wheels.

2. In a plow, the combination with a frame, a rear furrow wheel and a land wheel, of an inclined land wheel axle having a horizontal spindle at one end to enter the hub of the land wheel and also having a crank, a swiveled axle for the rear furrow wheel, an arm projecting from said swiveled axle, means connecting said arm with the crank on the land wheel axle, a hand lever, and a connection between said hand lever and said crank and the connection between the latter and the arm of the furrow wheel axle.

3. In a plow, the combination with a frame, a rear furrow wheel, and a land wheel, of a swiveled axle for the rear furrow wheel, an upwardly and inwardly inclined arm rigid with said axle, an inclined land-wheel axle having a horizontal spindle entering the hub of the land wheel, a crank on said inclined axle, a connection between said crank and the inclined arm on the furrow wheel axle, a hand lever, and a connection between said hand lever and the crank on the inclined land wheel axle.

4. In a plow, the combination with a frame, a land wheel, an axle therefor, and a rear furrow wheel, of a lever having two arms and provided with a bearing member, one of said arms connected with the frame by a horizontal pivot, an axle for the rear furrow wheel having a part mounted in the bearing member of said lever, a hand lever, and a connection between said hand lever and the other arm of said first-mentioned lever, whereby operation of the hand lever will effect raising or lowering of the frame by tilting the same on the land wheel as a fulcrum.

5. In a plow, the combination with a frame, a rear furrow wheel, and a land wheel, of a lever connected with the rear portion of the frame by a horizontal pivot, an axle bearing carried by said lever, an axle for the rear furrow wheel having a portion mounted in the bearing on said lever and an inclined spindle entering the hub of said wheel, a perpendicular land wheel, an axle therefor, and manually operable means connected with said lever for raising and lowering the frame on the land wheel as a fulcrum.

6. In a plow, the combination with a frame, a rear furrow wheel and a land wheel, of an inclined land wheel axle having a horizontal spindle entering the hub of the land wheel, said axle also provided with a crank, a rear lever pivoted to the rear portion of the frame by a horizontal pivot, a bearing member rigid with said lever, a rear furrow wheel axle swiveled in said bearing member, a laterally projecting arm rigid with said rear furrow-wheel axle, a lifting lever, a shifting lever, connections between the lifting lever and the rear lever, a connection between the shifting lever and the crank on the inclined land-wheel axle, and a connection between said crank and the laterally projecting arm on the rear furrow-wheel axle.

7. In a plow, the combination with a frame providing an intermediate laterally projecting bracket and a rear bracket, an earth engaging disk carried by said frame, a rear furrow wheel, and a land wheel, of an inclined land wheel axle supported by the intermediate bracket of the frame and having a horizontal spindle portion entering the hub of the land wheel, said axle also having a crank, a rear lever having a lower arm mounted on a horizontal spindle in said rear bracket, said lever also having an upper arm, a vertical bearing sleeve rigid with said lever, a rear axle swiveled in said bearing sleeve and having an inclined spindle portion entering the hub of the rear furrow wheel, a lifting lever, connecting means between said lifting lever and the upper arm of the rear lever, an arm rigid with the rear axle, connecting means between said arm and the crank on the land wheel axle, a shifting lever, and connecting means between said shifting lever and the crank on the land-wheel axle.

In testimony whereof, I have signed this specification in the presence of two subscribing witnesses.

CAMERON H. GEMBERLING.

Witnesses:
ELSIE M. ANDERSON,
A. J. F. JAVSKY.